(12) United States Patent
Tanaka et al.

(10) Patent No.: US 6,291,697 B1
(45) Date of Patent: Sep. 18, 2001

(54) SILOXANE COMPOUNDS, PROCESS FOR PREPARING THE SAME, AND LIQUID COMPOSITION CONTAINING THE SAME

(75) Inventors: Seiichirou Tanaka; Hanako Kato; Takeshi Sawai; Kenji Oba; Hozumi Endo, all of Kitakyushu; Haruo Katsumata, Tokyo, all of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/155,209

(22) PCT Filed: Mar. 25, 1997

(86) PCT No.: PCT/JP97/01002

§ 371 Date: Nov. 9, 1998

§ 102(e) Date: Nov. 9, 1998

(87) PCT Pub. No.: WO97/35908

PCT Pub. Date: Oct. 2, 1997

(30) Foreign Application Priority Data

| Mar. 25, 1996 | (JP) | 8-067897 |
| Mar. 26, 1996 | (JP) | 8-070241 |
| Oct. 31, 1996 | (JP) | 8-290148 |
| Feb. 13, 1997 | (JP) | 9-028908 |
| Feb. 14, 1997 | (JP) | 9-030393 |
| Feb. 19, 1997 | (JP) | 9-034775 |

(51) Int. Cl.$^7$ ..................................................... C07F 7/08
(52) U.S. Cl. ........................................... 556/457; 556/458
(58) Field of Search ............................. 512/457; 556/458

(56) References Cited

FOREIGN PATENT DOCUMENTS

| 2 155 281 | 5/1973 | (DE) . |
| 0 771 835 A2 | 5/1977 | (EP) . |
| 0 401 388 A1 | 12/1990 | (EP) . |
| 9-12583 | 1/1997 | (JP) . |
| 9-110887 | 4/1997 | (JP) . |

*Primary Examiner*—Paul F. Shaver
(74) *Attorney, Agent, or Firm*—Nixon & Vanderhye

(57) ABSTRACT

The siloxane compounds represented by the following formula:

$$SiO_a(OH)_b(OR^1)_c(OR^2)_d$$

wherein $1.0 \leq a \leq 1.6$, $0 \leq b < 0.3$, $0.2 \leq c \leq 2.0$, $0 \leq d \leq 1.4$, $2a+b+c+d=4$, $R^1$ is a methyl or ethyl group, and $R^2$ is an organic group different from $R^1$.

11 Claims, 3 Drawing Sheets

SILOXANE COMPOUNDS, PROCESS FOR PREPARING THE SAME, AND LIQUID COMPOSITION CONTAINING THE SAME

This application is a 35 U.S.C. §371 of PCT/JP97/01002, filed Mar. 25, 1997.

TECHNICAL FIELD

The present invention relates to novel and useful siloxane compounds, and their preparation processes and uses thereof.

RELATED ART

Attempts for improving the coating properties and qualities such as hardness, acid resistance, weather resistance, etc., have been made by introducing alkoxysilyl groups into organic resins. Recently, it has been conducted to study single use of alkoxysilanes such as tetraethoxysilane, tetramethoxysilane, methyltrimethoxysilane, ethyltrimethoxysilane, dimethyldimethoxysilane and vinyltrimethoxysilane or the oligomers produced from partial hydrolytic condensation of these alkoxysilanes, or combined use of these alkoxysilanes or their oligomers with pertinent resins as coating materials. The present inventors have previously proposed a suspension containing the microfine particles of a compound having the silanol-based reactive functional groups and capable of providing a very useful curable composition either by itself as a blend with the organic substances such as various types of resins and silane couplers (W095/17349), and compositions comprising the siloxane compounds represented by the following formula:

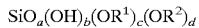

wherein $0.8 \leq a \leq 1.6$, $0.3 \leq b \leq 1.30$, $0.2 \leq c+d \leq 1.9$, $b=4-(2a+c+d)$, $R^1$ is a methyl or ethyl group, and $R^2$ is an organic group other than $R^1$ (Japanese Patent Application No. 7-157897).

The present inventors have also proposed the silicate compounds having a weight-average molecular weight of 600 to 2,200, which, although unable to cure by themselves, have prominently high storage stability (Japanese Patent Application No. 7-272433). These compounds are expected to motivate an improvement of the coating properties such as stain resistance, weather resistance and acid resistance when added in an amount of several to several ten percents to the organic components of various types of coating compositions.

The above-mentioned suspension and siloxane compounds are indeed capable of maintaining a liquid state stable in appearance for a long time, but it was found that when the solution is used for coating after having been preserved for longer than a prescribed period of time, the formed coating tends to deteriorate in its qualities such as hardness and resistance to boiling water. This is considered due to slow advance of the condensation reaction because of high reactivity of the silanol groups in the compound, resulting in a decrease of the silanol-based reactive functional groups. It was therefore considered that usefulness of these suspension and siloxane compounds would be greatly enhanced if their stability in the liquid state could be improved. Regarding the silicate compounds, it was disclosed by the present inventors that the larger their molecular weight, the more remarkable the effect of bettering the coating properties such as stain resistance, weather resistance, acid resistance, etc., is obtained when such compounds are added to the organic component of a coating composition. Development of the silicate compounds with higher molecular weights is therefore required. However, in producing a siloxane compound from hydrolytic condensation of an alkoxysilane, it is necessary for increasing the molecular weight of the produced compound to supply a large amount of water used for the hydrolysis. Supply of a large amount of water would lead to gelation of the compound, making it unable to obtain a stable liquid-state compound.

DESCRIPTION OF THE INVENTION

As a result of the present inventors' earnest studies to solve the above problems, it has been found that it is possible to obtain siloxane compounds which have high molecular weights and radiuses of inertia thereof falling within a specified range, are represented by a specific formula, are capable of minimizing in change of the functional groups with time, and can stay stably in a liquid state. The present invention has been attained based on this finding.

Thus, the present invention is constituted by:
(1) The siloxane compounds represented by the following formula:

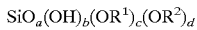

wherein $1.0 \leq a \leq 1.6$, $0 \leq b < 0.3$, $0.2 \leq c \leq 2.0$, $0 \leq d \leq 1.4$, $2a+b+c+d=4$, $R^1$ is a methyl or ethyl group, and $R^2$ is an organic group different from $R^1$;
(2) The siloxane compounds according to the above item (1), the said compounds having a radius of inertia of not more than 100 Å;
(3) The siloxane compounds according to the above items (1) or (2), the said compounds having a weight-average molecular weight in the range of 2,000 to 40,000;
(4) The siloxane compounds according to the above items (1) to (3), the said compounds containing a solvent;
(5) A liquid composition containing a siloxane compound as defined in any one of the above items (1) to (4);
(6) A liquid composition comprising a blend of a siloxane compound as defined in any one of the above items (1) to (4) and an organic compound compatible therewith;
(7) A liquid composition comprising a blend of a siloxane compound as defined in any one of the above items (1) to (4) and a powder;
(8) A liquid composition comprising a blend of the liquid composition as defined in the above item (6) and a powder;
(9) A cured product of a liquid composition as defined in any one of the above items (5) to (8);
(10) A process for producing a siloxane compound as defined in any one of the above items (1) to (4), which comprises hydrolytically condensing a tetraalkoxysilane by adding 1,0- to 1.6-fold molar quantity of water;
(11) A process for producing a siloxane compound as defined in any one of the above items (1) to (4), which comprises preparing a tetraalkoxysilane oligomer by hydrolytically condensing a tetraalkoxysilane monomer by adding less than 1.6-fold molar quantity of water, and further subjecting the said oligomer to hydrolytic condensation by adding water;
(12) A process for producing a siloxane compound as defined in any one of the above items (1) to (4), which comprises removing the alcohol produced in the hydrolytic condensation reaction of the tetraalkoxysilane out of the reaction system;
(13) A process for producing a siloxane compound as defined in any one of the above items (1) to (4), wherein when removing the alcohol produced in the hydrolytic condensation reaction of the tetraalkoxysilane out of the reaction system, a solvent having a higher boiling point than the alcohol is allowed to exist in the reaction system, and the system is maintained at a temperature lower than the boiling point of the solvent;

(14) The siloxane compound producing process according to any one of the above items (10) to (13), wherein the tetraalkoxysilane is tetramethoxysilane;

(15) The siloxane compound producing process according to any one of the above items (10) to (13), wherein addition of water to the tetraalkoxysilane is conducted at a temperature not exceeding 50° C.

Figure 1:
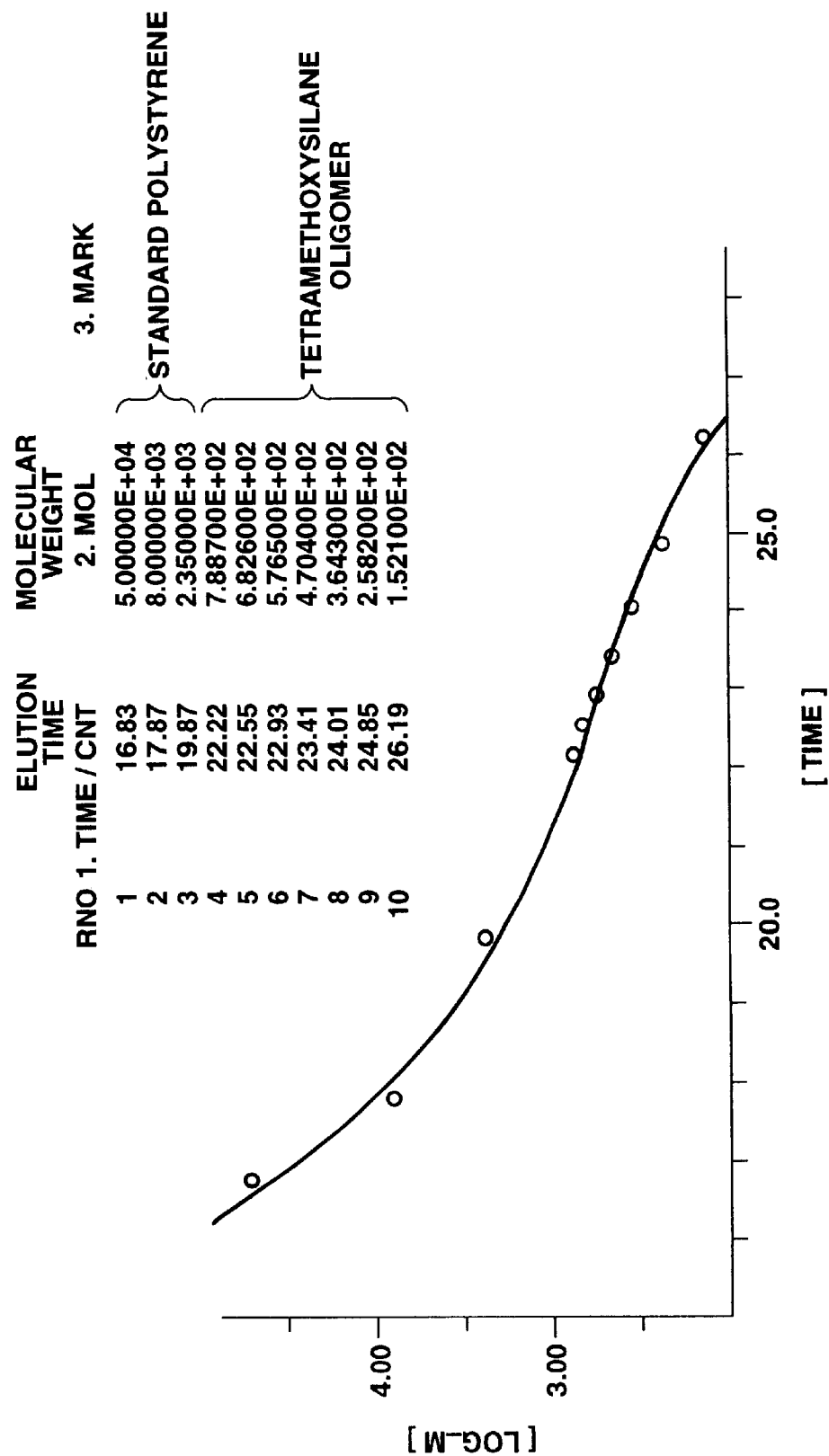
FIG. 1 shows a GPC calibration curve of the compound of Example 1, where standard polystyrene and a tetramethoxysilane oligomer were used.

The present invention is described in detail below.

The siloxane compounds of the present invention are represented by the following formula:

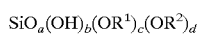

wherein $1.0 \leq a \leq 1.6$, $0 \leq b < 0.3$, $0.2 \leq c \leq 2.0$, $0 \leq d \leq 1.4$, $2a+b+c+d=4$, $R^1$ is a methyl or ethyl group, and $R^2$ is an organic group different from $R^1$.

The factor "a" in the above formula is specified to fall within the defined range of $1.0 \leq a \leq 1.6$, preferably $1.1 \leq a \leq 1.5$. When the factor "a" is within the range of $1.0 \leq a \leq 1.6$, the storage stability of the siloxane compounds either alone or blended with an organic compound discussed later and the properties of their cured products such as coating are most excellent in the maximal level. Also, when the factor "a" is in the above-defined range, it is possible to obtain most stably the siloxane compounds having a radius of inertia of not more than 100 Å and a weight-average molecular weight of 2,000 to 40,000. When the factor "a" is less than 1.0, the preferred degree of polymerization may not be obtained, making it unable to produce the siloxane compounds more than 2,000 in weight-average molecular weight. Also, when a coating is formed with such siloxane compounds alone or with a liquid composition obtained by blending one of such siloxane compounds with an organic compound, for example an organic polymer such as mentioned later, there may not be obtained satisfactory improvements of the coating properties such as scratch resistance, solvent resistance and stain resistance.

On the other hand, when the factor "a" is more than 1.6, the produced siloxane compound has too large molecular weight, with its weight-average molecular weight exceeding 40,000, and also the radius of inertia of the compound becomes more than 100 Å. Such a compound may be subject to the problem of high viscosity or gelation and may be also unsatisfactory in storage stability.

The radius of inertia can be easily determined by such means as small-angle X-ray scattering. Specifically, when the microfine particles are present, the incident X-ray diffraction intensity distribution shows a loose pattern of scattering, or so-called central scattering in the direction of the incident rays, namely small-angle X-ray scattering.

The scattering intensity I is given by the following Guinier's equation:

$$I=C\exp(-H^2 Rg^2/3)$$

wherein

I: scattering intensity,

H: scattering vector ($=2\pi\sin2\theta/\lambda$)

Rg: radius of inertia of microfine particles

C: constant $\lambda$: wavelength of incident X-rays $2\theta$: scattering angle.

The common logarithm of both members of the above Guinier's equation is expressed as $\log I = \log C - (H^2 Rg^2/3)$, so that in case where the microfine particles are present, the radius of inertia of the microfine particles can be determined by measuring the scattering intensity, plotting both logarithmic graphs against the scattering vector (the thus obtained plot being called "Guinier's plot") and calculating the inclination.

When the scattering intensity is sufficiently high, the distance distribution function can be determined by Fourier's conversion of the scattering vector, and the radius of inertia can be known from its peak position and the shape and its variation from the peak width.

The radius of inertia needs to be not more than 100 Å, preferably not more than 60 Å, more preferably not more than 40 Å, still more preferably not more than 30 Å. When the radius of inertia is thus defined, the storage stability of the compounds is excellent, and also the cured products of the blends of the siloxane compounds of the present invention with an organic compound are remarkably improved in stain resistance.

The factor "b" representing the amount of the hydroxyl groups (silanol groups) directly bonded to the silicon atoms is defined to be $0 \leq b < 0.3$, preferably not more than 0.2, more preferably not more than 0.1. When the factor "b" is more than 0.3, the qualities of the coating formed with a coating composition of the present invention tend to deteriorate. This is considered attributable to the following reason: the dealcoholizating condensation reaction of the silanol and alkoxyl groups is accompanied by formation of siloxane, which induces an increase of the molecular weight of the compound and a decrease of the functional groups with time. It has been found that the siloxane compounds of the present invention remain free of compositional change in the form of solution and are significantly improved in storage stability when the factor "b" is set to be not more than 0.3.

The factors "c" and "d", representing the amounts of other functional groups (alkoxyl groups) than silanol bonded to the silicon atoms via oxygen, are defined to fall within the range of $0.5 \leq (c+d) \leq 2.0$, preferably $0.8 \leq (c+d) \leq 1.8$. When "c+d" is less than 0.5, the produced siloxane compound is excessively enlarged in molecular weight and proceeds gelation easily. On the other hand, when "c+d" is more than 2.0, the coating formed with a siloxane compound of the present invention alone or with a liquid composition obtained by blending a siloxane compound of the present invention with an organic compound such as an organic polymer may be unsatisfactory in the degree of improvement of its properties such as scratch resistance, solvent resistance and stain resistance. This may be attributed to the insufficient degree of polymerization of the siloxane compound.

Further, "c/(c+d)" needs to be not less than 0.3, preferably not less than 0.5, more preferably not less than 0.7. When "c/(c+d)" is less than 0.3, the coating formed with a liquid composition obtained by blending a siloxane compound of the present invention with an organic compound such as an organic polymer may be unsatisfactory in its qualities such as hardness, chemical resistance and stain resistance.

In the formula of the compounds of the present invention, $R^1$ is a methyl or ethyl group. Especially, when it is a methyl group, the formed coating is improved in such qualities as hardness, chemical resistance and stain resistance, due to high reactivity of the methyl group.

It is to be noted that an elevation of the siloxane polymerization degree indicated by the factor "a" in the above formula may give rise to the problems in practical use of the compounds of the present invention in combination with an organic compound such as an organic polymer, because of "reduction of compatibility". Such "reduction of compatibility" is causative of occurrence of clouding or liquid separation, or precipitation of either of the compounds, during blending of a siloxane compound of the present invention and an organic compound. In such a case, there can not be obtained a uniform and transparent mixed solution, so that it is hardly possible to obtain a transparent and uniform coating with such a composition.

By the present inventors' further studies it has been found that the compatibility of the siloxane compounds of the present invention with the organic compounds such as various types of organic polymers can be easily improved by substituting part of $R^1$ with, for instance, a functional group $R^2$ having higher organic nature than $R^1$. In other words, it has been found that the compatibility of the siloxane compounds with the organic compounds can be improved by properly selecting $R^2$ as explained below when the organic compounds are blended with the siloxane compounds.

$R^2$ is the organic group other than $R^1$, preferably those obtained through ester exchange of $R^1$. Specifically, $R^2$ represents the organic groups obtained through ester exchange with monohydric or dihydric alcohols. Examples of such organic groups including alkyl groups, alkenyl groups, aryl groups, aralkyl groups, allyl groups, 1-methoxy-2-ethyl group, 1-ethoxy-2-propyl group, 1-methoxy-2-propyl group, 2-methoxyethyl group, 2-ethoxyethyl group, $C_2H_5OC_2H_4OC_2H_4$—, $CH_3C_2H_4OC_2H_4$—, $C_2H_5OC_2H_4$—, $CH_3OC_2H_4$—, and those of $R^1$ which were partly substituted with an activated hydrogen-containing compound such as disclosed in Japanese Patent Application Laid-Open (KOKAI) No. 2-256687. It is also possible to select plural different types of groups as $R^2$.

Introduction of group(s) of $R^2$ is particularly effective when a siloxane compound whose functional groups consist of $R^1$ alone is incompatible with an organic compound to be blended and/or the solvent therefor. The type of $R^2$ to be used and its ratio to $R^1$ may be properly selected in consideration of compatibility with the organic compound to be blended and the preferred properties of the cured product.

The method for obtaining these siloxane compounds of the present invention is not specified, and any method applicable for the purpose can be used. For instance, the siloxane compounds of the present invention can be produced according to the following process claimed in the present invention.

To a tetraalkoxysilane represented by the formula $Si(OR^1)_4$, usually about 1.0- to 1.6-fold molar quantity of water is added, to conduct a hydrolytic condensation reaction, which produces a polyalkoxysiloxane. "Polyalkoxysiloxane" means a compound whose skeletal structure is constituted by siloxane bonds $(Si-O)_n$, with the alkoxy groups bonded to the silicon atoms. The siloxane bonds may be linear, cyclic or branched. The amount of water added is preferably 1.05 to 1.5 moles, more preferably 1.1 to 1.4 moles based on one mole of the tetraalkoxysilane.

When the amount of water added is less than 1.0 mole based on one mole of the tetraalkoxysilane, the factor "a" in the formula of the produced siloxane compound tends to become less than 1.0, and the coating formed with a composition using such a compound tends to prove unsatisfactory in hardness and other properties.

On the other hand, when the amount of water added exceeds 1.6 moles based on one mole of the tetraalkoxysilane, the factor "a" in the formula of the produced siloxane compound tends to exceed 1.6, and such a siloxane compound is poor in storage stability. This also gives rise to the problems such as easy gelation of the compound in the step of solvent replacement described later.

In the present invention, a tetraalkoxysilane oligomer can be formed by first adding up to 1.6 moles of water based on one mole of a tetraalkoxysilane monomer to carry out hydrolytic condensation to a certain extent, and then water is further added to complete the hydrolytic condensation. The present invention may also be carried out by adding water to various types of commercial products of tetraalkoxysilane oligomers (e.g. MKC Silicate MS-51 produced by Mitsubishi Chemical Corporation). In this case, too, it is essential to control water feed so that the total amount of water used for forming an oligomer and water used in the conducting hydrolysis will fall within the range of 1.0 to 1.6 moles based on one mole of the tetraalkoxysilane monomer.

In case where a commercial oligomer is used, the amount of water added for forming the oligomer can be determined from the following reaction formula if the Si concentration of the oligomer is known. Therefore, the present invention can be carried out by adding water so that the total amount of water will become 1.0 to 1.6 moles based on one mole of Si.

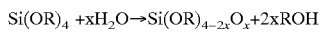

$$Si(OR)_4 + xH_2O \rightarrow Si(OR)_{4-2x}O_x + 2xROH$$

The Si concentration in the oligomer can be determined by a conventional method. For instance, it is convenient to use a method in which ammonia water is added to a small quantity of sample material to hydrolyze it to form a gel, then after drying away the formed methanol and water, the material is calcined at 900° C. for 2 hours in an electric furnace, and the remaining silica solids are weighed to determine the Si concentration.

A catalyst may be used in the hydrolytic condensation reaction. In the present invention, the known hydrolytic condensation catalysts, for example, organic acids such as oxalic acid, maleic acid, formic acid, acetic acid, benzenesulfonic acid and toluenesulfonic acid, inorganic acids such as hydrochloric acid, nitric acid and phosphoric acid, various types of boron compounds, organic metal compounds such as titanium compounds, aluminum compounds and tin compounds, metal complexes, and the like can be used. Hydrochloric acid is preferred as it can be easily removed after the reaction has been completed. The amount of hydrochloric acid used as a catalyst is usually $1 \times 10^{-6}$ to $1 \times 10^{-2}$ moles, preferably $1 \times 10^{-5}$ to $1 \times 10^{-3}$ moles, calculated as hydrogen chloride, based on one mole of the starting tetraalkoxysilane monomer. The method of addition of the catalyst is not specified in the present invention, for instance, it may be mixed or dissolved in water to be added, or it may be mixed or dissolved in the catalyst used.

A reaction solvent can be used in the hydrolytic condensation reaction according to the present invention. For instance, water-soluble organic solvents such as alcohols, ethers and ketones can be used, but since an alcohol is formed as a by-product in the hydrolytic condensation reaction of tetraalkoxysilane as mentioned above, it is preferable to use an alcohol of the same type as the by-product alcohol. It is usually preferred to use a $C_1$–$C_5$ alcohol, more preferably an alcohol having the same number of carbon atoms as the alkoxyl group of the starting- tetraalkoxysilane. Preferred examples of the alcohols for use in the present invention are methanol when the alkoxy group of the alkoxysilane is methoxy group, ethanol when the alkoxy group is ethoxy group, propanol when the alkoxy group is propoxy group, and butanol when the alkoxy group is butoxy group. Such a reaction solvent needn't be added more than necessary for uniformly dissolving the tetraalkoxysilane and water added thereto. Usually a reaction solvent is used in an amount of 0.1 to 10.0 moles, preferably 0.5 to 5.0 moles based on one mole of the tetraalkoxysilane.

In the partial hydrolytic condensation reaction of tetraalkoxysilane, a reaction solvent is previously mixed with the starting tetraalkoxysilane, and a determined amount of water is added thereto, if necessary with stirring. The temperature at which water is added is preferably not higher than the boiling point of the alcohol produced in the condensation reaction, preferably not higher than 50° C., more preferably not higher than 45° C. When this temperature is higher than 50° C., the produced siloxane compound tends to become cloudy. This is probably because a local condensation reaction takes place due to high temperature, causing formation of an extremely high molecular weight condensate.

The reaction mixture is heated under reflux to carry out a hydrolytic condensation reaction. The reflux temperature is set to be close to the boiling point of the reaction solvent or the boiling point of the by-product alcohol, preferably close to whichever is lower of these boiling points. The reaction time under reflux, although variable depending on the type of the catalyst used, is usually 0.5 to 10 hours, preferably 2 to 5 hours.

In this way, a siloxane compound of the present invention can be obtained as a liquid composition containing an alcohol which is a by-product of the hydrolytic condensation reaction. In case where a reaction solvent is used for the hydrolytic condensation, this reaction solvent is also contained in the liquid composition. Such a solvent is preferably used in a ratio of 95 to 5 parts by weight to 5 to 95 parts by weight of the siloxane compound. That is, the solvent feed is adjusted so that the siloxane compound will account for 5 to 95% by weight, more preferably 20 to 70% by weight of the liquid composition containing a siloxane compound of the present invention. When the content of the siloxane compound is less than 5% by weight, there arise the problems such as too small thickness of the coating formed with the composition itself and excessively low solids concentration in case where a siloxane compound of the present invention is used with an organic material for coating. On the other hand, when the content of the siloxane compound exceeds 70% by weight, the composition itself tends to proceed gelation easily and is intolerably reduced in storage stability.

When the siloxane compound content is out of the above defined range, the content can be corrected by properly adding or reducing the produced alcohol and/or the reaction solvent. The siloxane compound content referred to therein is a value determined as solids according to the method of JIS-K-5407.

To the said siloxane compound, a solvent having a higher boiling point than the alcohol formed by the hydrolytic condensation reaction of the tetraalkoxysilane and/or the solvent used in the reaction may be added. (This solvent having a higher boiling point than the by-product alcohol may hereinafter be called "high boiling point solvent".) Thus, these by-product alcohol and reaction solvent can be replaced with a high-boiling point solvent in the following way. After addition of a solvent having a higher boiling point than the alcohol formed by the hydrolytic condensation reaction of the tetraalkoxysilane or the solvent used in there action, these by-product alcohol and reaction solvent are distilled away from the reaction system and replaced with a high-boiling point solvent (This operation may hereinafter be called "solvent replacement"). The thus obtained siloxane compound having a high-boiling point solvent added thereto or subjected to solvent replacement with a high-boiling point solvent exhibit high compatibility with various types of organic components.

In the present invention, it is possible to use any type of organic solvent having a higher boiling point than the alcohol produced in the hydrolytic condensation reaction of the tetraalkoxysilane. In case of using other solvent in hydrolytic condensation, the said organic solvent should be the one having a higher boiling point than both of the said other solvent and the by-product alcohol. However, it is preferred to select a high-boiling point solvent having good compatibility with the organic components such as the resin used in combination with the siloxane compound.

Examples of the replacement solvents usable in the present invention include alcohols such as isopropyl alcohol, n-butanol and isobutanol; glycol derivatives such as ethylene glycol, ethylene glycol monomethyl ether, ethylene glycol monoethyl ether, ethylene glycol n-butyl ether, ethylene glycol monomethyl ether acetate, ethylene glycol monoethyl ether acetate, propylene glycol, propylene glycol monomethylether, propylene glycol monoethyl ether, propylene glycol monomethyl ether acetate, propylene glycol monoethyl ether acetate, diethylene glycol, diethylene glycol monomethyl ether, diethylene glycol monoethyl ether, diethylene glycol monomethyl ether and diethylene glycol monoethyl ether acetate; hydrocarbons such as toluene, xylene, kerosene and Solvesso; esters such as n-propyl acetate, isopropyl acetate, n-butyl acetate and isobutyl acetate; ketones such as methyl n-butylketone, methyl isobutyl ketone, diethyl ketone and dibutyl ketone; and ethers such as dibutyl ether and dioxane. These solvents may be used either singly or as a mixture of two or more of them in optional ratios.

A high-boiling point solvent is added in such an amount that the content of the siloxane compound falls within the range of 5 to 95% by weight. In case where part of the alcohol produced from hydrolytic condensation and the reaction solvent are contained, the said high-boiling point solvent is also preferably added in such an amount that the siloxane compound content becomes 5 to 95% by weight based on the total weight of the composition comprising the said siloxane compound, reaction solvent and high-boiling point solvent.

The solvent replacement can be accomplished by distilling off the alcohol produced from the hydrolytic reaction and/or the alcohol used as the reaction solvent after addition of a solvent having a higher boiling point than the said hydrolyzate alcohol and reaction solvent. The distillation operation can be conducted under any preferable conditions which allow distillation separation of the said alcohols. The known separating techniques such as simple distillation, flash distillation, vacuum distillation, inert gas blowing, etc., can be used for the distillation operation. For instance, in case where tetramethoxysilane is used as the tetraalkoxysilane and it is intended to hydrolytically condense it in a methanol solvent to form a polymethoxysilane and replace it with a xylene solvent, the distillation operation may be carried out in such a manner as to distill off methanol initially at about 65° C. which is the boiling point of methanol, with the temperature being steadily increased until it reaches close to about 144° C. which is the boiling point of xylene, thereby distilling off the best part of methanol. In this operation, methanol can be distilled off at higher efficiency and in a shorter time when an inert gas such as nitrogen gas is blown into the system at a space velocity (SV) of one to 100l/hr under a temperature condition lower than the boiling point of the high-boiling point solvent. For instance, in case where replacement is conducted with the said xylene solvent, an inert gas is blown in at 130 to 140° C. When this operation is carried out under reduced pressure, methanol is distilled off at a temperature close to the boiling point that coordinates with the degree of vacuum. In case where it is preferred to leave part of the hydrolyzate alcohol and/or the alcohol used as the reaction solvent, the end point of distillation is determined by checking the amount of methanol distilled off so that the remaining alcohol in the internal solution will have the specified concentration, or by analyzing the methanol concentration in the internal solution. When the solvent concentration goes outside the prescribed range, the concentration can be adjusted by posteriorly adding the alcohol or a high-boiling point solvent to the obtained solution.

For replacing part of $R^1$ in $\equiv Si(OR^1)$ with $R^2$, a prescribed amount of $R^2OH$ is added during initial feed or after the conclusion of the hydrolytic condensation reaction under reflux (or at the time of addition of a high-boiling point solvent in case where the said solvent replacement is conducted), and then the reaction system is heated to let the ester exchange reaction proceed while distilling off the by-product $R^1OH$ and/or the reaction solvent. The $R^2OH$ solvent used here is preferably the one having a higher boiling point than $R^1OH$ because of less distillation loss and easier control of the reaction.

In case where the reaction solvent is $R^1OH$ and the distillation thereof makes the siloxane compound too high in viscosity to give rise to the problem of instability, it is suggested to restore stability by adding a solvent of the type which remains unconcerned with ester exchange either before or after the ester exchange reaction. The solvents usable for this purpose include glycol derivatives such as ethylene glycol monomethyl ether acetate, ethylene glycol monoethyl ether acetate, propylene glycol monomethyl ether acetate, propylene glycol monoethyl ether acetate, diethylene glycol monomethyl ether acetate and diethylene glycol monoethyl ether acetate; hydrocarbons such as toluene, xylene, kerosene and Solvesso; esters such as n-propyl acetate, isopropyl acetate, n-butyl acetate and isobutyl acetate; ketones such as methyl n-butyl ketone, methyl isobutyl ketone, diethyl ketone and dibutyl ketone; and ethers such as dibutyl ether and dioxane. These solvents may be used either singly or as a mixture of two or more of them at any appropriate ratios. These solvents may be preferable added in such an amount that the content of the siloxane compound will fall within the range of 5 to 95% by weight. In case where the alcohol produced from the hydrolytic condensation, the reaction solvent and/or a high-boiling point solvent are contained, the high-boiling point solvent such as mentioned above is also preferably added in such an amount that the siloxane compound content will become 5 to 95% by weight based on the total weight of the said alcohol, reaction solvent and high-boiling point solvent.

In this way, it is possible to obtain the siloxane compounds of the present invention which find various useful applications. The above-described method is a typical means for obtaining the siloxane compounds of the present invention, and needless to say, it is possible to obtain the siloxane compounds of the present invention by other methods. The siloxane compounds of the present invention obtained by these methods are usually the liquid siloxane compounds comprising a mixture of the compounds with different polymerization degrees. The formula of these liquid siloxane compounds can be determined, for example, in the following way.

(1) The number of the oxygen atoms bonded to the Si atoms is determined by $^{29}$Si-NMR to define the value of the factor "a".
(2) The number of the alkoxy groups such as methoxy groups bonded to the Si atoms is determined by $^{13}$C-NMR or $^1$H-NMR to define the value of the factor "c".
(3) The factor "b" in the formula of the compounds of the present invention is calculated from the equation "b=4−(2a+c)". When d=0, the calculation can be made on the following premise of reaction:

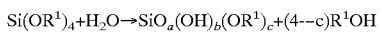
$Si(OR^1)_4+H_2O \rightarrow SiO_a(OH)_b(OR^1)_c+(4-c)R^1OH$

When d≠0, the calculation can be made on the following premise of reaction:

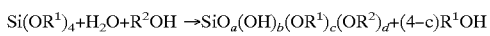
$Si(OR^1)_4+H_2O+R^2OH \rightarrow SiO_a(OH)_b(OR^1)_c(OR^2)_d+(4-c)R^1OH$ The above method is a typical means for determining the formula of the siloxane compounds of the present invention, and needless to say, such formula can as well be determined by other methods such as gas chromatographing $R^1OH$ and $R^2OH$ formed from the hydrolysis of the produced compounds.

The siloxane compounds of the present invention obtained in the manner described above are high in degree of polymerization, have a large number of alkoxy groups which are the hydrolyzable functional groups, and yet can maintain high storage stability for more than one year. Further, they are capable of maintaining a transparent liquid state free of compositional change.

The siloxane compounds of the present invention having many excellent characteristics distinguishable from those of the conventional siloxane compounds can be used, for instance, as a hydrolyzed solution for hard coating. Also, when these compounds are used as a liquid coating composition by blending an organic compound such as a resin, the coating obtained therefrom is improved in such properties as scratch resistance, impartation of hydrophilicity, stain resistance, acid resistance, weather resistance and heat resistance as compared with the coatings containing no organic compound. Of course, the siloxane compounds of the present invention themselves or the compositions prepared by blending a resin therewith may be diluted with various types of solvent for use as a coating solution.

The organic compounds to be blended with the siloxane compounds of the present invention are preferably the ones which are compatible with the siloxane compounds of the present invention. The term "compatible" used here means that blending of these compounds causes no clouding of the solution or liquid separation nor precipitation of either of the compounds and allows formation of an apparently uniform and transparent mixed solution. This means that the siloxane compound may not necessarily be dissolved perfectly in the mixed solution.

The organic compounds that can be blended with the siloxane compounds of the present invention are, for instance, those having carboxyl groups, hydroxyl groups, amino groups, alkoxy groups or the like. More specifically, they include:

(I) silane couplers (generally those represented by $RSiX_3$ (X: hydrolyzable group; R: organic group));
(II) alkylalkoxysilicones;
(III) polymers such as acrylic resins, epoxy resins, polyester resins, urethane resins, etc.;
(IV) polyhydric alcohols such as 1,4-butanediol, glycerin, catechol, resorcin, etc.

To be more particular, the silane couplers (I) include methyl acrylate-based silane couplers such as:

epoxy-based silane couplers such as:

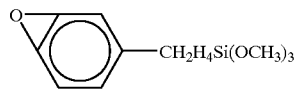

-continued

amine-based silane couplers such as:
$H_2NC_3H_6Si(OC_2H_5)_3$,
$H_2NC_2H_4NHC_3H_6Si(OCH_3)_3$,
$H_2NCONHC_3H_6Si(OC_2H_5)_3$,
vinyl-based silane couplers such as:
$CH_2=CHSi(OC_2H_5)_3$,
$CH_2=CHSi(OCH_3)_3$,
$CH_2=CHSi(OC_2H_4OCH_3)_3$,
and mercapto-based silane couplers such as:
$HS=C_3H_6Si(OCH_3)_3$,
$HS=C_3H_6SI(OC_2H_5)_3$,
$HS=C_3H_6Si(OC_2H_4OCH_3)_3$, Any of these silane couplers can be preferably used for the intended purpose. A coating with better adhesion can be obtained by selecting the optimal silane coupler according to the type of the base material to be coated, the preferred coating properties and other factors.

The alkylalkoxysilicones (II) include those represented by the following formula:

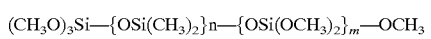

n, m =1–10

As for the polymers (III), the following polymers may be cited as preferred examples having good compatibility with the siloxane compounds of the present invention:

① Acrylic Resins
(a) those represented by the following formula:

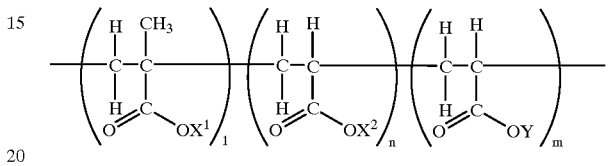

wherein $X^1$ and $X^2$ are each a $C_{1-C4}$ alkyl group, and Y is $c_zH_{2z}OH$ is a number of 1 to 4.
(b) those having γ-MTS (γ-methacryloxypropyltrimethoxysilane) added to the structure of (a) shown above ② Epoxy Resins

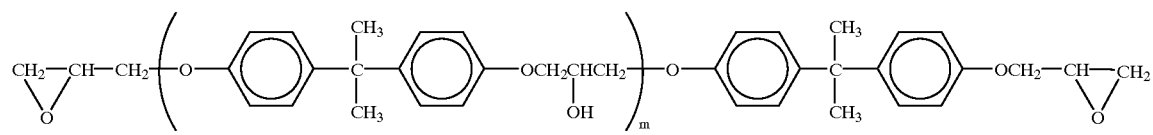

m=0(Mw=340),m=1(Mw=620),etc.

③ Polyester Resins

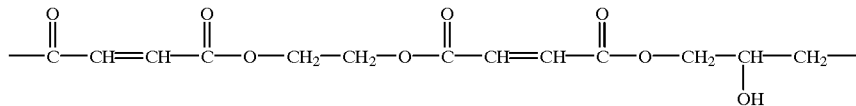

④ Polyurethane Resins

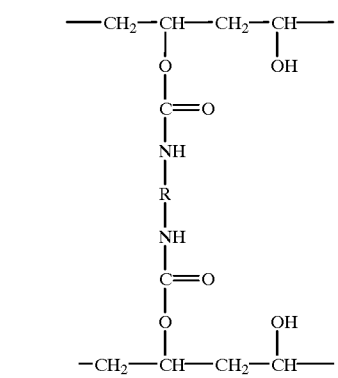

The above are exemplification of the organic compounds that can be blended with the siloxane compounds of the present invention, that is, the organic compounds which are usable in the present invention are not limited to those shown above, and as mentioned above, any of the compounds compatible with the siloxane compounds of the present invention is applicable to the purpose of the present invention.

The said organic compounds can be used in combination according to the intended use of the product.

The combination of a resin and a silane coupler, for example, the combination of an epoxy resin and an epoxy-based silane coupler, an acrylic resin and an acryl-based silane coupler, or a polyester resin and an epoxy-based silane coupler, can improve the coating adhesion to the base material and also enhance resin component/siloxane compound compatibility to better the coating qualities. In such combined use of the materials, the two or more materials may be blended in advance or may be added severally to a siloxane compound.

Blending of a siloxane compound and an organic compound may be conducted either at room temperature or under heating. If necessary, a solvent, dispersant or curing catalyst may be further added.

The mixing ratio of organic compound/siloxane compound may be widely range for producing the preferred effect, that is, an organic compound may be added in a ratio that can be selected from a wide range of 1 to 5,000 parts by weight based on 100 parts by weight of a siloxane compound. In case where properties of hardness and high-temperature heat resistance of the siloxane compounds of the present invention are impregnated, an organic compound is preferably added in a ratio of one to 400 parts by weight to 100 parts by weight of a siloxane compound. In this case, the concentration of the compound calculated as $SiO_2$ in the nonvolatiles in the blend is preferably in the range of 10 to 95% by weight. In case where properties of stain resistance and weather resistance to the coating mainly composed of an organic compound, with a siloxane compound used as a subordinate, are provided while maintaining flexibility and coating thickness increasing capability of an organic compound, especially an organic resin, the organic compound is preferably blended in a ratio selected from the range of 500 to 5,000 parts by weight based on 100 parts by weight of a siloxane compound, and in this case the compound concentration calculated as $SiO_2$ in the nonvolatiles in the blended solution is preferably 1 to 10% by weight.

The components, especially a siloxane compound and an organic compound such as mentioned above, in the blended solution may exist in a condensed state in the solution, or may exist in a simply mixed state. Such state of existence may be properly selected according to the type of the organic compound used and the purpose of use of the produced composition. The condensation reaction can be accelerated by heating and/or removing the by-product alcohol out of the reaction system.

For compatibilizing a siloxane compound of the present invention and an organic compound such as mentioned above, it is suggested to add a pertinent solvent or dispersing medium to the blend to form a liquid composition. In the case of certain types of organic compound, such compatibilization can be effected by allowing to stand and then stirring the blend of a siloxane compound and an organic compound for a specified period of time.

An ordinary wet process or dry process can be used for treating various types of powdery materials with a siloxane compound or a liquid composition of the present invention. For instance, in case of using a dry process, it is expedient to use an apparatus provided with a mixer or stirrer such as a Henschel mixer and also having a drying function.

A powdery material to be treated and a prescribed amount of a siloxane compound are supplied and stirred at room temperature until the powder surface is wetted sufficiently, then the mixture is heated to 100 to 150° C. with stirring to promote the crosslinking reaction of the siloxane compound while evaporating the volatiles such as water to obtain the surface treated powder. In case where it is hard to uniformly wet the powdery material with a prescribed amount of the siloxane compound, the siloxane compound may be diluted with water. Especially, where it is preferred to enhance affinity for the matrix, the powdery material may be surface treated with a siloxane compound of the present invention or its water-diluted solution in advance, and after dried if necessary, it may be further treated with a liquid composition of the present invention.

Since the siloxane compounds and the liquid compositions of the present invention have good affinity for various types of base material, the type of powder that can be treated is not restricted. For instance, it is possible to treat the polysiloxane compounds or the silicon-containing compositions of the present invention with the powders of various types of inorganic materials, for example, glass; cement; concrete; metals such as iron, copper, nickel, gold, silver, aluminum, rare earth and cobalt; carbonaceous materials such as carbon black, graphite, carbon fiber, activated carbon and hollow carbon spheres; oxides such as silica, alumina, titanium oxide, beryllium oxide, iron oxide, zinc oxide, magnesium oxide, tin oxide, antimony oxide, barium ferrite and strontium ferrite; hydroxides such as aluminum hydroxide and magnesium hydroxide; carbonates such as calcium carbonate and magnesium carbonate; sulfates such as calcium sulfate; silicates such as talc, clay, mica, calcium silicate, glass, hollow glass spheres and glass fiber, calcium titanate, lead titanate zirconate, aluminum nitride, silicon carbide, cadminum sulfide, etc., and organic fillers such as woodmeal, starch, various types of organic pigments, polystyrene, nylon, etc., no matter whether these fillers are of general purpose type or of the functional type for imparting such properties as conductivity, electromagnetic wave shieldability, magnetism and sound insulation, heat conductivity, flame retardancy and wear resistance. The powders which have been surface treated with a polysiloxane compound or a silicon-containing composition of the present invention can be used as fillers for various types of industrial materials and products, for example, paints such as oil paint, synthetic resin paint, water-soluble resin paint, emulsion paint, aggregate-incorporated emulsion paint, traffic paint and putty coking, rubber products such as shoe sole, electric wire, tire, industrial parts, belt, hose, rubber coated fabric, rubber paste, adhesive tape, latex and back-sizing, papers such as coating paper, interior paper and synthetic paper, synthetic resin products such as the products made of PVC, polyolefins, epoxy phenols and unsaturated polyesters, electric welding rod, glass articles, acid neutralizing agents, pharmaceuticals, foods, sugar products, dentifrice, cleanser, bunker sand, agricultural chemicals, assorted feed, construction materials, etc. Also, these powders may be blended in fibers and resins as a filler and molded into FRP (fiber-reinforced plastics).

For impregnating a siloxane compound or a liquid composition of the present invention in a porous material such as paper, the material is tipped with the siloxane compound or liquid composition and then dried. It is possible to impart such properties as flame retardancy and smoothness to the treated material by conducting a crosslinking reaction at normal temperature or under heating. In case where a siloxane compound or a liquid composition of the present invention is used for the purpose of adhesion or bonding, the compound or composition is applied to the adhered surfaces and these surfaces are held against each other before the applied compound or composition is perfectly hardened. If the adhered surfaces are precoated with a siloxane compound of the present invention or its hydrolyzed solution, the adhesive strength is increased.

Further, the liquid compositions or the siloxane compounds of the present invention can be applied as a coating material as it is or by adding a pigment. They may also be prepared into a curable composition blended with an inorganic or organic fibber, such composition being cured to provide a composite material.

The pigments usable for the above purpose include the inorganic pigments, for example, lead compounds such as leadwhite, zinc compounds such as zinc white and lithopone, titanium compounds such as titanium oxide, cobalt compounds such as aureolin, cobalt green, cerulean blue 2, cobalt blue and cobalt violet, iron compounds such as iron oxide, chromium compounds such as chromium oxide, lead chromate and barium chromate, cadminum compounds such as cadminum sulfate and cadminum sulfoselenide, carbon black and the like, and the organic pigments, for example, colored compounds such as water-insoluble phthalocyanine type, dioxazine type, anthraquinone type and quinophthalone type, and metal-containing versions thereof. Other compounds which are applicable for the purpose of coloring the liquid compositions of the present invention are also usable as well. These compounds can be used either singly or as a mixture of two or more of them.

As filler, there may be used the inorganic filler materials, for example, carbonaceous materials such as carbon black, graphite and carbon fiber, oxides such as silica, alumina and magnesium oxide, hydroxides such as aluminum hydroxide and magnesium hydroxide, carbonates such as calcium carbonate and magnesium carbonate, sulfates such as calcium sulfate, and silicon compounds such as talc, clay, mica, calcium silicate and glass fiber, and the organic materials, for example, organic high-molecular weight compounds such as polystyrene, polyethylene, polypropylene and nylon, woodmeal, starch, etc. These filler materials can be used either singly or as a mixture of two of more of them.

When a siloxane compound or a liquid composition of the present invention is applied as a coating material by adding a pigment, it is possible to easily form a silicon-containing coating having a pigment uniformly dispersed therein if the said siloxane compound or liquid composition is previously dispersed in an organic compound.

As described above, the siloxane compounds and the liquid compositions of the present invention and the cured products thereof exhibit various useful properties in many fields of application, and thus they are of great utility in the industries concerned.

EXAMPLES

The present invention is further illustrated by the following examples of the invention.

Example 1

Synthesis of Siloxane Compound 1

To a glass-made 2-litre four-necked round flask provided with a stirrer, a Dimroth condenser and a thermometer, 608.2 g of tetramethoxysilane and 505.6 g of methanol were supplied and stirred for 5 minutes, to which a mixture of 8.16 g of a 0.1 N hydrochloric acid solution and 78.4 g of water was added. The molar ratio of water to tetramethoxysilane was 1.2.

Then the mixture was heated until it assumed a state of reflecting (65° C.), and reacted under reflux for 4 hours. The reaction product was allowed to cool to room temperature and then taken out of the flask to obtain 1197 g of a colorless and transparent liquid siloxane compound 1.

The formula of this siloxane compound 1: $SiO_a(OH)_b(OCH_3)_c$ was determined in the following way:

(1) The number of the O atoms bonded to the Si atoms was determined by $^{29}$Si-NMR to find the value of the factor "a".
(2) The number of the alkoxy groups such as methoxy groups bonded to the Si atoms was determined by $^{13}$C-NMR to find the value of the factor "c".
(3) The factor "b" in the above formula was calculated from the equation: b=4−(2a+c). The calculation was made under the following premise of reaction:

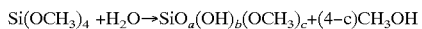

$$Si(OCH_3)_4 + H_2O \rightarrow SiO_a(OH)_b(OCH_3)_c + (4-c)CH_3OH$$

The siloxane compound 1 obtained in the manner described above is represented by the following formula:

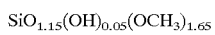

$$SiO_{1.15}(OH)_{0.05}(OCH_3)_{1.65}$$

The molecular weight of this siloxane compound 1 was determined from GPC analysis described below.

Conditions of GPC Analysis

Apparatus: Waters High-Temperature GPC 150C.
Columns: PLgel, one 500 Å (5μ) column and two 100 Å (5μ) columns
Temperature: column, 40° C.; inlet, 30° C.; pump, 30° C.
Solvent: chloroform, 1.0 ml/min
Detector: RI detector, 32×1, RIU/FS
Specimen: diluted to 5 wt % conc. with chloroform and injected 100 μl
Charting speed: 5 mm/min
Data processor: Toso CP-8000

The GPC calibration curve of the compound, obtained by using standard polystyrene and a tetramethoxysilane oligomer, is shown in FIG. 1.

As a result, the weight-average molecular weight of the siloxane compound 1 was determined to be 2015.

The radius of inertia of the microfine particles was determined by small-angle scattered X-ray analysis described below.

Conditions of Small-Angle Scattered X-ray Analysis

X-ray generator: RU-200B (rotational anti-cathode type) mfd. by Rigaku Denki KK
X-ray source: Cu-Kα-rays
Plate graphite incident monochrometer was used.
Current and voltage: 50 kV, 200 mA
Optical system: Kratky camera mfd. by Rigaku Denki KK
U-slit, 70 μm wide and 15 mm high
Detector: Rigaku Denki PSPC
Light-receiving slit: 8 mm high; integration time: 4,000 sec.; number of channels: 512 (45.4 ch/deg)
Distance from specimen to detector: 300 mm As a result, the radius of inertia of the siloxane compound 1 was determined to be about 5 Å.

In an accelerated preservation test of this siloxane compound 1 conducted hermetically at 50° C. for 45 days (corresponding to about one year preservation at room temperature), the liquid viscosity increased only by 0.1 cp from initial 1.1 cp to 1.2 cp, which indicates that this liquid compound has excellent storage stability.

Example 2
Synthesis of Siloxane Compound 2

To a glass-made 2-litre four-necked round flask provided with a stirrer, a Dimroth condenser and a thermometer, 608.2 g of tetramethoxysilane and 491.2 g of methanol were supplied and stirred for 5 minutes, to which a mixture of 8.16 g of a 0.1N hydrochloric acid solution and 92.8 g of water was added. The molar ratio of water to tetramethoxysilanewas 1.4.

Then the mixture was heated until it assumed a stateof reflecting (65° C.), and reacted under reflux for 4 hours. The reaction product was allowed to cool to room temperature and then taken out of the flask to obtain 1196 g of a colorless and transparent liquid siloxane compound 2.

NMR analysis same as conducted in Example 1 showed that this siloxane compound 2 had the following formula:

$$SiO_{1.35}(OH)_{0.06}(OCH_3)_{1.24}$$

GPC analysis of this siloxane compound 2, as in Example 1, showed that the weight-average molecular weight of this compound was 3165. Also, small-angle scattered X-ray analysis showed that the radius of inertia of the microfine particle was approximately 8 Å. In an accelerated preservation test of this siloxane compound conducted hermetically at 50° C. days (corresponding to about one year preservation at room temperature), the liquid viscosity increased only by 0.3 cp from initial 1.3 cp to 1.6 cp, which attests to the excellent storage stability of this liquid compound.

Example 3
Synthesis of Siloxane Compound 3

To a glass-made 2-litre four-necked round flask provided with a stirrer, a Dimroth condenser and a thermometer, 608.2 g of tetramethoxysilane and 476.8 g of methanol were supplied and stirred for 5 minutes, to which a mixture of 8.16 g of a 0.1N hydrochloric acid solution and 107.2 g of water was added. The molar ratio of water to tetramethoxysilane is 1.6.

Then the mixture was heated until it assumed a stateof reflecting (65° C.), and reacted under reflux for 4 hours. The reaction product was allowed to cool to room temperature and then taken out of the flask to obtain 1198 g of a colorless and transparent liquid siloxane compound 3.

NMR analysis of this siloxane compound 3 showed that this compound had the following formula:

$$SiO_{1.46}(OH)_{0.08}(OCH_3)_{1.00}$$

The radius of inertia of the microfine particles of this compound, as determined by small-angle scattered X-ray analysis as in Example 1, was about 15 Å. In an accelerated preservation test of this siloxane compound 3 conducted hermetically at 50° C. for 30 days (corresponding to about 8 month preservation at room temperature), the liquid viscosity increased only by 0.4 cp from initial 2.3 cp to 2.7 cp, indicating excellent storage stability of this liquid-state compound.

Example 4
Synthesis of Siloxane Compound 4

To a glass-made 1-litre four-necked round flask provided with a stirrer, a Dimroth condenser and a thermometer, 381.0 g of tetramethoxysilane and 120.0 g of methanol were supplied and stirred for 5 minutes, to which a mixture of 5.0 g of a 0.1N hydrochloric acid solution and 49.0 g of water was added. The molar ratio of water to tetramethoxysilanewas 1.2.

Then the mixture was heated until assuming a state of reflecting (65° C.), and reacted under reflux for 4 hours. The reaction mixture was cooled to about 56° C. and 382.5 g of xylene was added. The mixture was heated gradually with stirring and methanol was distilled off until the internal temperature reached about 135° C. With the internal temperature kept at 135° C., nitrogen gas was blown through the mixture and this situation was maintained for 5 hours. On cooling the resulting product, there was obtained 556.3 g of a colorless and transparent liquid siloxane compound 4 with a methanol content of not more than 1 wt % and a xylene content of 56.2 wt %.

NMR analysis of this siloxane compound 4 showed that it had the following formula:

$$SiO_{1.17}(OH)_{0.04}(OCH_3)_{1.62}$$

This siloxane compound was also determined to have a weight-average molecular weight of 2608 by GPC analysis, and the radius of inertia of its microfine particles, as determined by small-angle scattered X-ray analysis, was about 6 Å. In an accelerated preservation test of this siloxane compound 4 conducted hermetically at 50° C. for 45 days (corresponding to about one year preservation at room temperature), the liquid viscosity increased only by 0.6 cp from initial 2.0 cp to 2.6 cp, ensuring excellent storage stability of this compound.

Example 5
Synthesis of Siloxane Compound 5

To a glass-made 1-litre four-necked round flask provided with a stirrer, a Dimroth condenser and a thermometer, 304.0 g of tetramethoxysilane and 96.0 g of methanol were supplied and stirred for 5 minutes, to which a mixture of 4.0 g of a 0.1N hydrochloric acid solution and 39.0 g of water was added. The molar ratio of water to tetramethoxysilanewas 1.2.

Then the mixture was heated till assuming a state of reflecting (65° C.) and reacted under reflux for 4 hours. The reaction mixture was allowed to cool to room temperature, then after replacing the Dimroth condenser with a Liebig condenser, 300.0 g of xylene, 221.0 g of 2-phenoxyethanol and 0.12 g of tetraisopropoxyethane were supplied and heated gradually with stirring to conduct an ester exchange reaction while distilling off methanol at about 65° C. After heating till finally reaching an internal temperature of 146° C. and a distillation temperature of about 144° C., the resulting product was cooled and 119.5 g of xylene was added to obtain 590.2 g of a colorless and transparent liquid siloxane compound 5 with a methanol content of 0.3 wt %, an unreacted 2-phenoxyethanol content of 1.9 wt % and a xylene content of 40.5 wt %. The formula of this siloxane compound:

$$SiO_a(OH)_b(OCH_3)_c(OC_2H_4OC_6H_5)_d$$

was analyzed by NMR in the same way as in Example 1, making the calculation on the following premise of reaction:

$$Si(OCH_3)_4 + H_2O + C_6H_5OC_2H_4OH$$

$$SiO_a(OH)_b(OCH_3)_c(OC_2H_4OC_6H_5)d + (4n-C)CH_3OH$$

By this method, the formula of the siloxane compound 5 was determined to be as follows:

$$SiO_{1.11}(OH)_{0.16}(OCH_3)_{0.89}(OC_2H_4OC_6H_5)_{0.73}$$

GPC analysis determined the weight-average molecular weight of this siloxane compound 5 to be 2650, and small-angle scattered X-ray analysis found that the radius of inertia of the microfine particles was about 6 Å. In an accelerated preservation test of this siloxane compound 5 conducted hermetically at 50 ° C. for 45 days (corresponding to about one year preservation at room temperature), the liquid viscosity increased only by 0.6 cp from initial 7.8 pc to 8.4 cp, indicating excellent storage stability of this liquid compound.

Example 6
Synthesis of Siloxane Compound 6

To a glass-made 1-litre four-necked round flask provided with a stirrer, a Dimroth condenser and a thermometer, 456.6 g of tetramethoxysilane and 144.0 g of methanol were supplied and stirred for 5 minutes, to which a mixture of 6.0 g of a 0.1 N hydrochloric acid solution and 59.4 g of water was added. The molar ratio of water to tetramethoxysilanewas 1.21.

Then the mixture was heated till assuming a state of reflecting (65° C.) and reacted under reflux for 4 hours. The reaction mixture was allowed to cool to room temperature, then after feeding 40.0 g of n-butanol, the mixture was gradually heated with stirring and maintained under reflux (67° C.) for one hour, then the Dimroth condenser was replaced with a Liebig condenser, and the ester exchange reaction was carried on while distilling off methanol at around 67° C. Temperature was gradually elevated until finally the internal temperature reached 150° C., at which point high-purity nitrogen gas was blown through the mixture at a rate of 83 ml/min, and this situation was maintained for 5 hours. Thereafter, the mixture was allowed to cool, and when the internal temperature reached around 80° C., 359 g of xylene was added. On further cooling of the mixture to room temperature, there was obtained 668 g of a colorless and transparent liquid siloxane compound 6 with a methanol content of 0.1 wt %, an unreacted n-butanol content of 0.1 wt % and a xylene content of 54.2 wt %.

The molecular weight of this siloxane compound 6 was determined from GPC analysis described below.
Conditions of GPC Analysis
Apparatus: Waters High-Temperature GPC 150C.
Columns: Plgel, two 500 Å (5$\mu$) column and one 100 Å (5$\mu$) columns
Temperature: column, 40 ° C.; inlet, 30° C.; pump, 30° C.
Solvent: ethyl acetate, 1.0 ml/min
Detector: RI detector, −32×1, RIU/FS
Specimen: diluted to 5 wt % conc. with ethyl acetate and injected 100 $\mu$l
Charting speed: 5 mm/min
Data processor: Toso CP-8000

Figure 2:
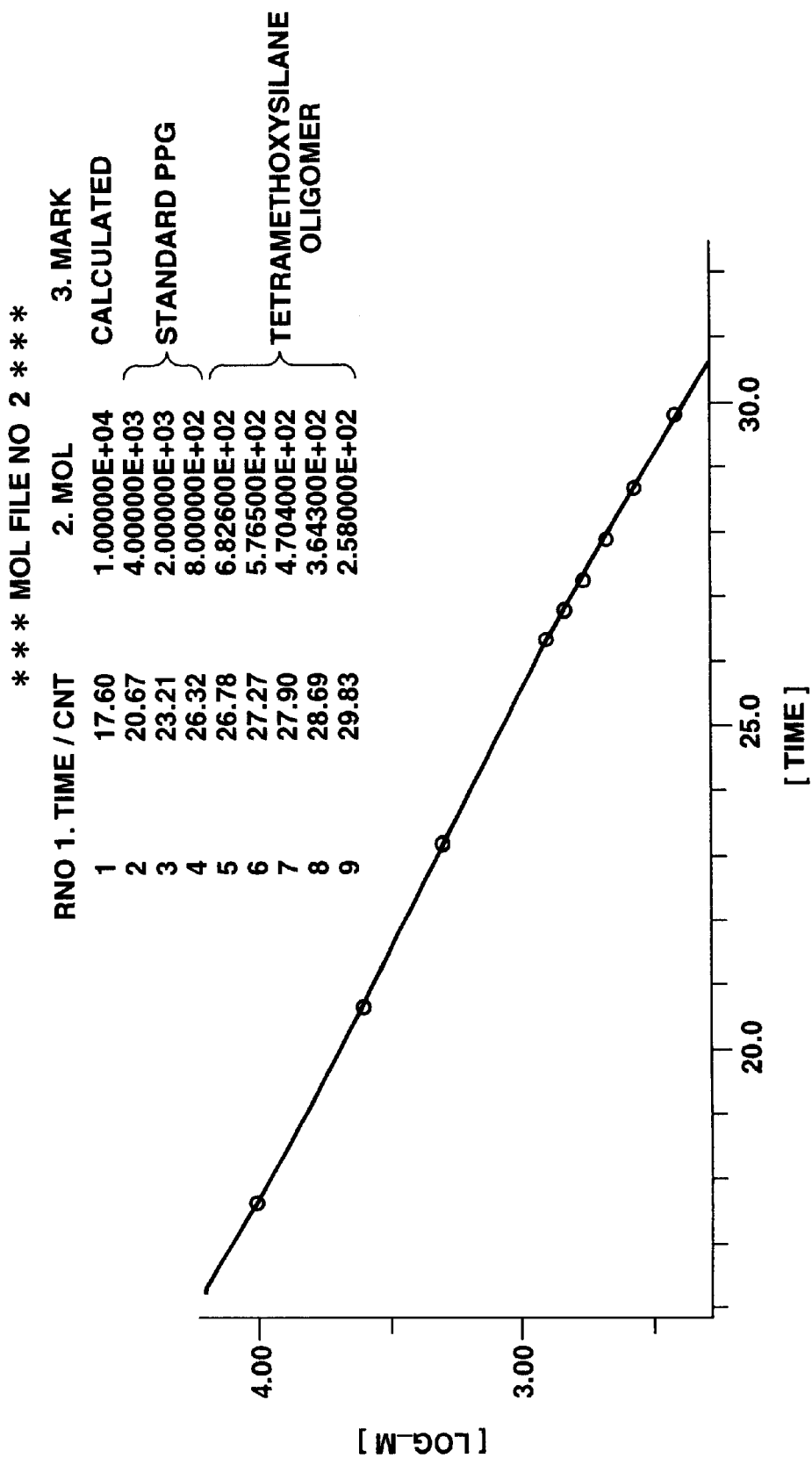
FIG. 2 shows a GPC calibration curve of the compound of Example 6, where standard polypropylene glycol and a tetramethoxysilane oligomer were used.

The GPC calibration curve of the compound 6, obtained by using standard polypropylene glycol and a tetramethoxysilane oligomer, is shown in. FIG. 2.

It was found that the weight-average molecular weight of the siloxane compound 6 was 2843. In an accelerated preservation test of this siloxane compound 6 conducted hermetically at 50° C. for 45 days (corresponding to about one year preservation at room temperature), the liquid viscosity increased only by 0.1 cp from initial 2.8 cp to 2.9 cp, storage stability of this liquid compound.

Example 7
Synthesis of siloxane Compound 7

To a glass-made 1-litre four-necked round flask provided with a stirrer, a Dimroth condenser and a thermometer, 343.1 g of tetramethoxysilane and 108.2 g of methanol were supplied and stirred for 5 minutes, to which a mixture of 4.51 g of a 0.1N hydrochloric acid solution and 44.2 g of water was added. The molar ratio of water to tetramethoxysilanewas 1.2.

The mixture was heated till assuming a state of reflecting (65° C.) and reacted under reflux for 4 hours. The reaction mixture was allowed to cool to about 56° C. and 350 g of isophorone was added. this mixture was heated gradually with stirring, and methanol was distilled off as the internal temperature reached around 65° C. Gradual heating was continued until finally the internal temperature reached 135° C., at which point high-purity nitrogen gas was blown through the solution at a rate of 45 ml/min and this situation (135° C.) was maintained for 5 hours. Cooling of the resulting product to room temperature gave 564.2 g of a light-yellow transparent liquid siloxane compound 7 with a methanol content of 0.2 wt % and an isophorone content of 60.2 wt %.

GPC analysis determined the weight-average molecular weight of this siloxane compound 7 to be 2500, and the radius of inertia of the microfine particles, as determined by small-angle scattered X-ray analysis, was about 12 Å.

In an accelerated preservation test of this siloxane compound 7 conducted hermetically at 50° C. for 45 days (corresponding to about one year preservation at room temperature),the liquid viscosity increased only by 0.3 cp from initial 5.2 cp to 5.5 cp, indicating excellent storage stability of this liquid compound.

Example 8
Synthesis of Siloxane Compound 8

To a glass-made 1-litre four-necked round flask provided with a stirrer, a Dimroth condenser and a thermometer, 380.5 g of tetramethoxysilane and 120.0 g of methanol were supplied and stirred for 5 minutes, to which a mixture of 5.0 g of a 0.1 N hydrochloric acid solution and 51.7 g of water was added. The molar ratio of water to tetramethoxysilanewas 1.26.

The mixture was heated till assuming a state of reflecting (65° C.) and reacted under reflux for 4 hours. The reaction mixture was allowed to cool to about 56° C. and 370.5 g of isophorone was added. The mixture was then gradually heated with stirring, and methanol was distilled off as the internal temperature reached around 65° C. Gradual heating was continued until finally the internal temperature reached 135° C., at which point high-purity nitrogen gas was blown through the solution at a rate of 45 ml/min, this situation being maintained for 5 hours. The resulting product was allowed to cool to room temperature to give 600.8 g of a light-yellow transparent liquid siloxane compound 8 with a methanol content of 0.2 wt % and an isophorone content of 59.8 wt %.

GPC analysis same as conducted in Example 6 determined this siloxane compound 8 to have a weight-average molecular weight of 3362. The radius of inertia of the microfine particles of the compound, as determined by small-angle scattered X-ray analysis, was about 16 Å.

In an accelerated preservation test of this siloxane compound 8 conducted hermetically at 50° C. for 45 days (corresponding to about one year preservation at room temperature),the liquid viscosity increased only by 0.2 cp from initial 6.3 cp to 6.5 cp, which confirmed excellent storage stability of this liquid compound.

Example 9
Synthesis of siloxane Compound 9

To a glass-made 1-litre four-necked round flask provided with a stirrer, a Dimroth condenser and a thermometer, 380.5 g of tetramethoxysilane and 120.0 g of methanol were supplied and stirred for 5 minutes, to which a mixture of 5.0 g of a 0.1N hydrochloric acid solution and 54.4 g of water was added. The molar ratio of water to tetramethoxysilane was 1.32.

The mixture was heated till assuming a state of reflecting (65° C.) and reacted under reflux for 4 hours. The reaction mixture was allowed to cool to about 56° C. and 368.1 g of isophorone was added. This mixture was gradually heated with stirring and methanol was distilled off as the internal temperature reached around 65° C. Gradual heating was continued until finally the internal temperature reached 135° C., at which point high-purity nitrogen gas was blown through the solution at a rate of 45 ml/min, this situation being maintained for 5 hours. The solution was then allowed to cool to room temperature to give 601.0 g of a light-yellow transparent liquid siloxane compound 9 with a methanol content of 1.3 wt % and an isophorone content of 59.2 wt %.

This siloxane compound 9 was determined to have a weight-average molecular weight of 4501 by GPC analysis. The radius of inertia of the microfine particles of the compound, as determined by small-angle scattered X-ray analysis, was about 18 Å.

In an accelerated preservation test of this siloxane compound 9 conducted hermetically at 50° C. for 45 days (corresponding to about one year preservation at room temperature), the liquid viscosity increased only by 0.3 cp from initial 7.9 cp to 8.2 cp, demonstrating excellent storage stability of this liquid compound.

Example 10
Synthesis of siloxane Compound 10

To a glass-made 1-litre four-necked round flask provided with a stirrer, a Dimroth condenser and a thermometer, 152.0 g of tetramethoxysilane and 122.8 g of methanol were supplied and stirred for 5 minutes, to which a mixture of 2.0 g of a 0.1N hydrochloric acid solution and 23.2 g of water was added. The molar ratio of water to tetramethoxysilane was 1.4.

The mixture was heated till assuming a state of reflecting (65° C.) and reacted under reflux for 4 hours. The resulting solution was cooled to around 56° C. and 313 g of propylene glycol monomethyl ether acetate (PGMAc) was added. The mixture was heated gradually with stirring and methanol was distilled off as the internal temperature reached around 65° C. Heating was continued till finally reaching an internal temperature of 148° C. and a distillation temperature of 146° C., and then the solution was cooled to obtain 302 g of a colorless and transparent liquid siloxane compound 10 with a methanol content of 1 wt % and a PGMAc content of about 71 wt %.

This siloxane compound 10 was found to have a weight-average molecular weight of 16930 on GPC analysis.

In an accelerated preservation test of this siloxane compound 10 conducted hermetically at 50° C. for 45 days (corresponding to about one year preservation at room temperature), the liquid viscosity increased only by 2.8 cp from initial 5.5 cp to 8.3 cp, indicating high storage stability of this liquid compound.

Example 11
Synthesis of Siloxane Compound 11

To a glass-made 1-litre four-necked round flask provided with a stirrer, a Dimroth condenser and a thermometer, 152.0 g of tetramethoxysilane and 122.8 g of methanol were supplied and stirred for 5 minutes, to which a mixture of 2.0 g of a 0.1 N hydrochloric acid solution and 23.2 g of water was added. The molar ratio of water to tetramethoxysilanewas 1.4.

Then the mixture was heated till assuming a state of reflecting (65° C.) and reacted under reflux for 4 hours. The resulting solution was cooled to around 55° C. and 313 g of xylene was added. The mixture was heated gradually with stirring and methanol was distilled off as the internal temperature reached about 65° C. The solution was kept heated till finally reaching an internal temperature of 146° C. and a distillation temperature of 144° C., and then cooled to obtain 299 g of a colorless and transparent liquid siloxane compound 11 with a methanol content of not more than 1 wt % and a xylene content of about 71 wt %.

GPC analysis found that this siloxane compound 11 had a weight-average molecular weight of 20680. The radius of inertia of the microfine particles of the compound, as determined by small-angle scattered X-ray analysis, was about 39 Å.

In an accelerated preservation test of this siloxane compound 11 conducted hermetically at 50° C. for 28 days, the liquid viscosity increased only by 0.7 cp from initial 1.7 cp to 2.4 cp, indicating excellent storage stability of this liquid compound.

Comparative Example 1
Synthesis of siloxane Compound 12

0.38 g of aluminum triacetylacetate was added to a mixed solution of 38.46 g of a tetramethoxysilane oligomer (MKC Silicate MS51 produced by Mitsubishi Chemical Corporation) and 53.0 g of ethanol and dissolved by stirring at room temperature. After adding 8.15 g of water, the mixture was allowed to stand hermetically at room temperature for 3 days to obtain 99.9 g of a siloxane compound 12.

NMR analysis showed that this siloxane compound 12 had the following formula:

The molecular weight of this siloxane compound 12 was determined from GPC analysis described below.

Conditions of GPC Analysis
Apparatus: Waters High-Temperature GPC 150C.
Columns: PLgel, one 500 Å (5$\mu$) column and two 100 Å (5$\mu$) columns
Temperature: column, 40° C.; inlet, 30° C.; pump, 30° C.
Solvent: ethyl acetate, 1.0 ml/min
Detector: RI detector, −32×1, RIU/FS
Specimen: diluted to 5 wt % conc. with ethyl acetate and injected 100 $\mu$l
Charting speed: 5 mm/min
Data processor: Toso CP-8000

Figure 3:
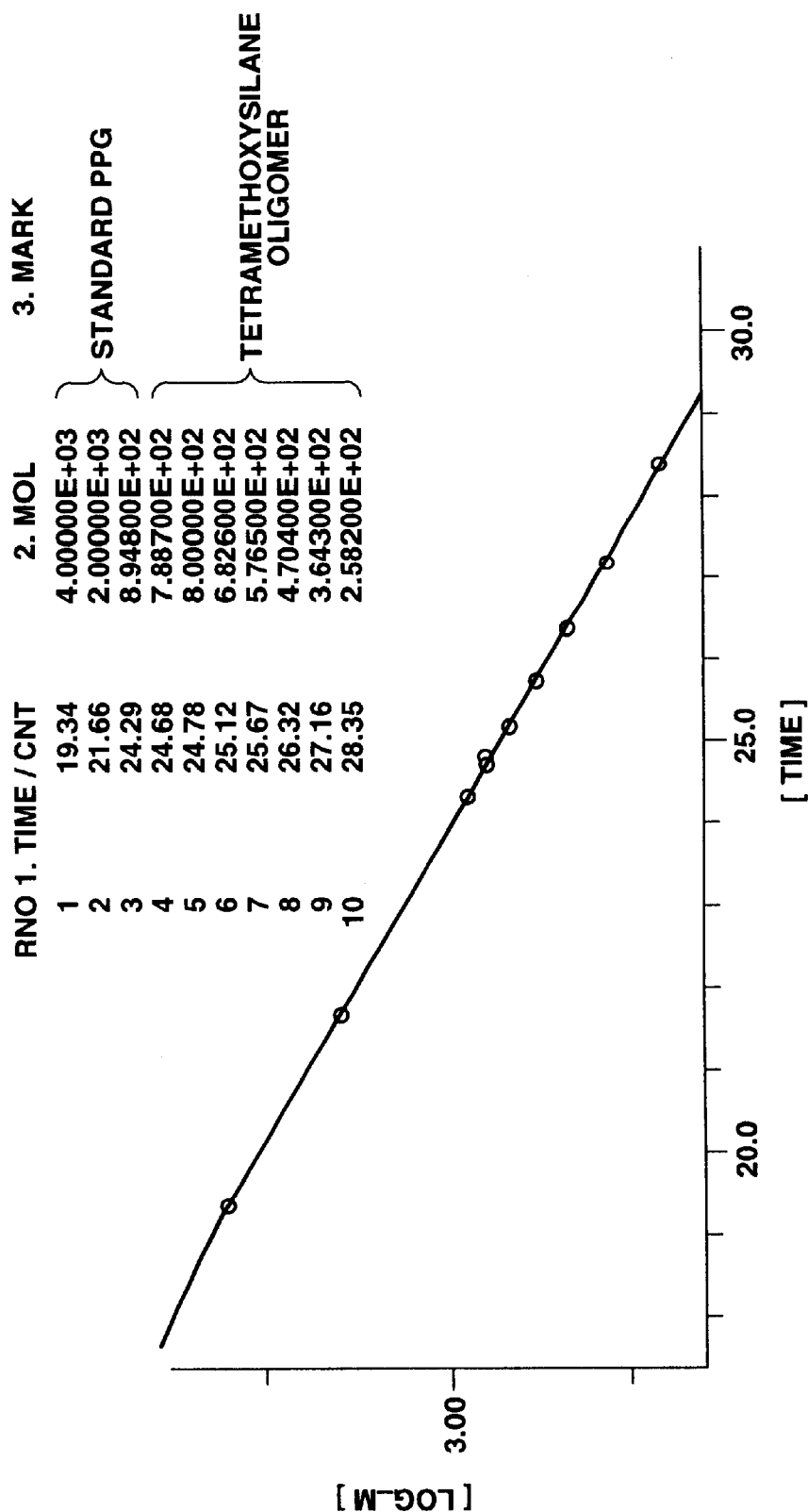
FIG. 3 shows a GPC calibration curve of the compound of Comparative Example 1, where standard polypropylene glycol and a tetramethoxysilane oligomer were used.

The GPC calibration curve of the compound, obtained by using standard polypropylene glycol and a tetramethoxysilane oligomer, is shown in FIG. 3. From this, the weight-average molecular weight of the siloxane compound 12 was determined to be 1040.

The radius of inertia of the microfine particles, as determined by small--angle scattered X-ray analysis, was about 6 Å. In an accelerated preservation test of this compound conducted hermetically at 50° C., the compound gelled in 10 days.

Comparative Example 2
Solvent Replacement of Siloxane Compound 12

To a simple distillation apparatus comprising a glass-made 200-ml four-necked round flask provided with a stirrer, a thermometer and a Liebig condenser, 50.0 g of the siloxane compound 12 obtained in Comparative Example 1 and 40.0 g of xylene were supplied and gradually heated with stirring, letting methanol distill away on reaching the distillation temperature of around 65° C., whereupon the whole solution was caused to gel while the internal solution was clouded.

Examples 12–17

Liquid compositions were prepared by blending the siloxane compounds 1 to 5 and 12 obtained in Examples 1 to 5 and Comparative Example 1 respectively with an organic high-molecular weight compound. Compatibility of these compositions is shown in Table 1 and their coating properties are shown in Table 2.

Examples 18–29

A small quantity of the siloxane compound 4 obtained in Example 4 was added to the enamels prepared by dispersing titanium oxide in the various organic high-molecular weight compounds to confirm compatibility and coat forming peroperties. The results are shown in Table 3.

Table 1

Compatibility of liquid compositions

Liquid composition (siloxane compound/organic high-molecular weight compound)

Blending ratio

| Example No. | Siloxane compound | Organic high-molecular weight compound | Silica-reduced concentration in coating | Compatibility (visual appearance) |
|---|---|---|---|---|
| 12 | Example 1 100.0 g | Hydroxy-containing acryl resin 150.5 g | 21 Wt % | ○ Uniform and transparent |
| 13 | Example 2 100.0 g | Hydroxy-containing acryl resin 150.5 g | " | ○ Uniform and transparent |
| 14 | Example 3 100.0 g | Hydroxy-containing acryl resin 150.5 g | " | ○ Uniform and transparent |
| 15 | Comp. Example 1 100.0 g | Hydroxy-containing acryl resin 150.5 g | " | ○ Uniform and transparent |
| 16 | Comp. Example 2 100.0 g | Silyl-containing acryl resin 136.8 g | " | ○ Uniform and transparent |
| 17 | Example 5 100.0 g | Silyl-containing acryl resin 136.8 g | " | ○ Uniform and transparent |

TABLE 2-1

Coating properties of liquid compositions

| Example No. | Coating thickness ($\mu$m) | Appearance ($\Delta$H) | Pencil hardness | Solvent resistance | 3 mm ⌀ flexing resistance |
|---|---|---|---|---|---|
| 12 | about 20 | Colorless and transparent (0) | HB | Δ~○ | ○ |
| 13 | " | Colorless and transparent (0) | F | ○ | ○ |
| 14 | " | Colorless and transparent (0) | F | ○ | ○ |
| 15 | " | Colorless and transparent (0) | F | ○ | X |
| 16 | " | Clouded (16) | — | — | — |
| 17 | " | Colorless and transparent (0) | 2B | Δ~○ | ○ |

TABLE 2-2

Coating properties of liquid compositions

| Comp. Example No. | Coating thickness ($\mu$m) | Appearance ($\Delta$H) | Pensil hardness | Solvent resistance | 3 mm ⌀ flexing resistance |
|---|---|---|---|---|---|
| Comp. Example No. 3[1]) | " | Colorless and transparent (0) | ≦6B Eluted | X | ○ |
| Comp. Example No. 4[2]) | " | Colorless and transparent (0) | ≦6B Eluted | X | ○ |

1) Coating of hydroxy-containing acryl resin alone
2) Coating of silyl-containing acryl resin alone (Coating forming conditions)

Base: glass and aluminum

Application: 150 $\mu$m applicator

Curing: 150° C., 2 hr. (Coating properties evaluation methods)

Appearance: visual observation and measurement of $\Delta$H by hazeometer (using glass base)

Pensil hardness: see JIS FK 5400 General Testing Methods for Coatings

Solvent resistance: after the surface of coating layer was rubbed 100 times with a xylene containing cotton cloth, scratch of the surface or elution of the coating were observed vidually.

○: no change, Δ: little scrtched, X:seriously scratched or elution flexing resistance: see JIS K 5400 General Testing Methods for Coatings

TABLE 3-1

Compatibility and coating forming properties after addition of a small quantity of siloxane compound

| Example No. | Blending ratio | | | 
|---|---|---|---|
| | Amount of siloxane compound 4 added | Organic high-molecular weight compound ✱-1 | Silica-reduced concentration in coating ✱-2 |
| 18 | Not added | Enamel A 100 g | — |
| 19 | 3.8 g | Enamel A 96.2 g | 3.9 wt % |
| 0 | Not added | Enamel B 100 g | — |
| 21 | 2.3 g | Enamel B 97.7 g | 2.9 wt % |
| 22 | Not added | Enamel C 100 g | — |
| 23 | 2.6 g | Enamel C 97.4 g | 2.8 wt % |

| Example No. | Coating forming properties | | |
|---|---|---|---|
| | Compatibility (visual observation) | Coating appearance | Glossiness (gloss at 60°) |
| 18 | — | White | 80 |
| 19 | ○ Uniformly mixed | White | 79 |
| 20 | — | White | 81 |
| 21 | ○ Uniformly mixed | White | 77 |
| 22 | — | White | 83 |
| 23 | ○ Uniformly mixed | White | 82 |

TABLE 3-2

Compatibility and coating forming properties after addition of a small quantity of siloxane compound

| Example No. | Blending ratio | | |
|---|---|---|---|
| | Amount of siloxane compound 4 added | Organic high-molecular weight compound ✱-1 | Silica-reduced concentration in coating ✱-2 |
| 24 | 2.7 g | Resin D 97.3 g | 2.0 wt % |
| 25 | Not added | Enamel D 100 g | — |
| 26 | 3.9 g | Enamel D 96.1 g | 3.9 wt % |
| 27 | 2.2 g | Resin E 97.8 g | 2.0 wt % |
| 28 | Not added | Enamel E 100 g | — |
| 29 | 3.3 g | Enamel E 96.7 g | 3.8 wt % |

| Example No. | Coating forming properties | | |
|---|---|---|---|
| | Compatibility (visual observation) | Coating appearance | Glossiness (gloss at 60°) |
| 24 | ○ Uniformly mixed | Colorless and transparent | — |
| 25 | — | White | 84 |
| 26 | ○ Uniformly mixed | White | 84 |
| 27 | ○ Uniformly mixed | Colorless and transparent | — |
| 28 | — | White | 78 |
| 29 | ○ Uniformly mixed | White | 79 |

✱-1 Enamel A: white enamel prepared by dispersing titanium oxide in an acrylic silicone resin in a weight ratio of 1:1 as solids
Enamel B: white enamel prepared by dispersing titanium oxide in a mixture of a polyester resin and a block isocyanate in a weight ratio of 1:1 as solids
Enamel C: white enamel prepared by dispersing titanium oxide in a mixture of a fluorine resin and a block isocyanate in a weight ratio of 1:1 as solids
Resin D: fluorine-containing acrylic silicone resin
Enamel D: white enamel prepared by dispersing titanium oxide in a fluorine-containing acrylic silicone resin in a weight ratio of 1:1 as solids
Resin E: vinyl acetate-based acrylic resin
Enamel E: white enamel prepared by dispersing titanium oxide in a vinyl acetate-based acrylic resin in a weight ratio of 1:1 as solids
✱-2 Silica-reduced concentration in coating (wt %)=(silica-reduced amount of siloxane compound/siloxane compound residue after heating+resin residue after heating (containing no titanium oxide))×100 (Coating forming conditions)
Base: tinplate
Application: #30 bar coater (dry coating thickness: about 20 μm
Curing: 170° C., 20 min.

Industrial Applicability

The siloxane compounds of the present invention are high in the degree of polymerization and still have excellent storage stability as they can be maintained in a transparent liquid state without causing any compositional change for more than one year. They can be used for hard coating as a hydrolyzed solution. Also, because of excellent compatibility with various kinds of organic compounds such as resins, the said siloxane compounds can be used for imparting hydrophilicity to or improving stain resistance, acid resistance, chemical resistance, weather resistance, heat resistance, etc., of the coatings formed by curing the liquid compositions obtained by blending the siloxane compounds with the said compatible organic compounds. The siloxane compounds of the present invention further find various other uses, such as binder for sand mold for castings. Thus, the present invention offers the novel siloxane compounds which are capable providing the high-utility liquid compositions.

What is claimed is:

1. A process for preparing a siloxane compound represented by the following formula:

$$SiO_a(OH)_b(OR^1)_c(OR^2)_d$$

wherein $1.0 \leq a \leq 1.6$, $0 \leq b < 0.3$, $0.2 \leq c \leq 2.0$, $0 \leq d \leq 1.4$ and $2a+b+c+d=4$,
$R^1$ is a methyl or ethyl group, and $R^2$ is an organic group different from $R^1$ which process comprises hydrolytically condensing a tetraalkoxysilane by adding thereto 1.0- to 1.6-fold molar quantity of water.

2. The process for producing the siloxane compound as defined in claim 1, which process comprises first preparing a tetraalkoxysilane oligomer by hydrolytically condensing a tetraalkoxysilane monomer by adding thereto up to 1.6-fold molar quantity of water, and further hydrolytically condensing said tetraalkoxysilane oligomer by adding water thereto.

3. The process for producing a siloxane compound according to claim 1 or 2 comprising the step of removing alcohol formed from the hydrolytic condensation reaction of a tetraalkoxysilane.

4. The process for producing a siloxane compound according to claim 3, wherein when the alcohol is removed, a solvent having a higher boiling point than said alcohol is allowed to exist in the reaction system, and the reaction system is maintained at a temperature lower than the boiling point of said solvent.

5. The process for producing a siloxane compound according to claim 1 or 2, wherein the tetraalkoxysilane is tetramethoxysilane.

6. The process for producing a siloxane compound according to claim 1 or 2, wherein water is added to the tetraalkoxysilane at a temperature not higher than 50° C.

7. The process according to claim 1, wherein $0.5 \leqq (c+d) \leqq 2.0$.

8. The process according to claim 1, wherein $R^1$ is a methyl group.

9. The process according to claim 1, wherein the siloxane compound has a radius of inertia determined by small-angle X-ray scattering of not more than 100 Å.

10. The process according to claim 1, wherein the siloxane compound has a weight-average molecular weight in the range of 2,000 to 40,000.

11. The process according to claim 1, wherein the siloxane compound has a tetraalkoxysilane monomer content of not more than 0.5% by weight.

* * * * *